US009866776B2

(12) United States Patent
Nishizawa

(10) Patent No.: US 9,866,776 B2
(45) Date of Patent: Jan. 9, 2018

(54) IMAGE SENSOR, IMAGE CAPTURING APPARATUS, AND CELLULAR PHONE

(71) Applicant: CANON KABUSHIKI KAISHA, Tokyo (JP)

(72) Inventor: Hideta Nishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/542,006

(22) Filed: Nov. 14, 2014

(65) Prior Publication Data

US 2015/0146063 A1    May 28, 2015

(30) Foreign Application Priority Data

Nov. 26, 2013  (JP) ................................. 2013-244331

(51) Int. Cl.
| | |
|---|---|
| *H04N 5/378* | (2011.01) |
| *H04N 9/73* | (2006.01) |
| *H04N 9/04* | (2006.01) |

(52) U.S. Cl.
CPC .................. *H04N 5/378* (2013.01)

(58) Field of Classification Search
CPC ........ H04N 5/378; H04N 5/374; H04N 5/347; H04N 9/735; H04N 9/045; H01L 27/14612; H01L 27/14638
See application file for complete search history.

(56) References Cited

U.S. PATENT DOCUMENTS

| | | | |
|---|---|---|---|
| 6,357,027 B1 | 3/2002 | Frankowsky | |
| 8,946,610 B2 * | 2/2015 | Iwabuchi | ............ H01L 27/1464 250/208.1 |
| 2003/0058235 A1 | 3/2003 | Moon | |

(Continued)

FOREIGN PATENT DOCUMENTS

| | | |
|---|---|---|
| CN | 1649033 A | 8/2005 |
| CN | 1909042 A | 2/2007 |

(Continued)

OTHER PUBLICATIONS

The above foreign patent documents were cited in a Aug. 29, 2016 Korean Office Action, which is enclosed without an English translation, in Korean Patent Application No. 10-2014-0162264.

(Continued)

*Primary Examiner* — Roberto Velez
*Assistant Examiner* — Tuan Le
(74) *Attorney, Agent, or Firm* — Cowan, Liebowitz & Latman, P.C.

(57) ABSTRACT

An image sensor in which a first chip and a second chip are stacked comprises: a pixel unit; output lines each configured to output a pixel signal from the pixel unit; and an analog-digital converter provided for each of the output lines. The analog-digital converter comprises a plurality of sets of the following configuration: reference signal generation units configured to generate a reference signal, a comparison unit configured to compare a signal level of a pixel signal output to one of the output lines with a signal level of the reference signal, a counter configured to count until the signal level of the pixel signal coincides with the signal level of the reference signal compared by the comparison unit. The pixel unit is arranged in the first chip and the analog-digital converter is arranged in the second chip.

16 Claims, 12 Drawing Sheets

(56) References Cited

U.S. PATENT DOCUMENTS

| | | | | |
|---|---|---|---|---|
| 2008/0136948 | A1* | 6/2008 | Muramatsu | H04N 5/335 348/294 |
| 2010/0259660 | A1* | 10/2010 | Kukita | H04N 5/23241 348/308 |
| 2011/0025900 | A1* | 2/2011 | Kondo | H04N 5/378 348/308 |
| 2011/0037868 | A1* | 2/2011 | Ota | H04N 5/357 348/222.1 |
| 2012/0008028 | A1* | 1/2012 | Egawa | H04N 5/378 348/300 |
| 2014/0022430 | A1* | 1/2014 | Ueno | H04N 5/37455 348/308 |
| 2014/0252202 | A1* | 9/2014 | Chou | H04N 5/3355 250/208.1 |
| 2014/0362271 | A1* | 12/2014 | Kanagawa | H04N 5/359 348/308 |

FOREIGN PATENT DOCUMENTS

| | | |
|---|---|---|
| CN | 101056364 A | 10/2007 |
| CN | 101118730 A | 2/2008 |
| CN | 101959009 A | 1/2011 |
| CN | 102244741 A | 11/2011 |
| CN | 102314840 A | 1/2012 |
| CN | 103220477 A | 7/2013 |
| EP | 1758085 A2 | 2/2007 |
| JP | 2005-328135 A | 11/2005 |
| JP | 2010-225927 A | 10/2010 |
| JP | 4640507 B | 3/2011 |
| JP | 2012-104684 A | 5/2012 |
| KR | 10-2011-0014089 A | 2/2011 |
| WO | 2013/080412 A1 | 6/2013 |
| WO | 2013/084809 A1 | 6/2013 |

OTHER PUBLICATIONS

The above foreign patent documents were cited in a May 18, 2017 Chinese Office Action, which is enclosed with an English Translation, that issued in Chinese Patent Application No. 201410690498.9.

The above foreign patent documents were cited in a Aug. 18, 2017 Japanese Office Action, which is enclosed without an English Translation, that issued in Japanese Patent Application No. 2013244331.

The above foreign patent documents #1-4 and the U.S. Patent document #1 were cited in the Sep. 13, 2017 Chinese Office Action, which is enclosed with an English Translation, that issued in Chinese Patent Application No. 201410690498.9.

* cited by examiner

IMAGE SENSOR, IMAGE CAPTURING APPARATUS, AND CELLULAR PHONE

BACKGROUND OF THE INVENTION

Field of the Invention

The present invention relates to an image sensor, an image capturing apparatus, and a cellular phone and, more particularly, to an image sensor including an A/D converter, and an image capturing apparatus and cellular phone that use the image sensor.

Description of the Related Art

There has been conventionally proposed an image sensor with a pixel readout circuit which includes an analog-digital converter (to be referred to as a "column A/D converter hereinafter) for each pixel column. In the mechanism of the column A/D converter, a comparator compares the level of a pixel signal with the level of a reference signal which ramps up. After that, the time from when output of the reference signal starts until the output of the comparator is inverted is counted, and the counted time is output as the digital value of the signal output, thereby performing A/D conversion.

There exist comparators, the number of which is equal to that of columns, and which are arrayed along one side or two opposite sides of a pixel region in which a plurality of pixel circuits are arranged. Reference signal lines for applying a reference voltage to the plurality of comparators are laid out along one side of the pixel region so as to be connected to the plurality of comparators, and each reference signal line is connected to one input terminal of each comparator.

To improve the image quality, there is a tendency to increase the pixel density, and the interval between the comparators is becoming small, thereby causing coupling between the output of one comparator and the pixel signal or reference signal of an adjacent column. When coupling occurs, the voltage level of the pixel signal or reference signal may vary. Especially when the voltage level of the reference signal varies, the timing at which the output of the comparator of the column is inverted may shift from the original timing when the voltage level does not vary, and thus it may be impossible to obtain a digital output corresponding to the amount of received light. A phenomenon in which the outputs of the plurality of comparators are simultaneously inverted when the voltage level of the reference signal does not vary readily occurs when an object whose brightness is uniform is captured and the voltage levels of a plurality of pixel signals (in column signal wirings) input from a plurality of photoelectric conversion elements to the plurality of comparators are equal to each other. To deal with the problem in which the voltage level of a reference signal varies, in Japanese Patent No. 4640507, the input terminals of a comparator to which a reference signal and pixel signal are input are exchanged for each set of adjacent columns. With this arrangement, since the inversion levels of the comparators of the adjacent columns are opposite to each other, the phases and magnitudes of variations of the voltage levels of the reference signals are opposite to each other, thereby reducing the influence.

In the conventional technique disclosed in Japanese Patent No. 4640507, however, it is expected that variations of the voltage levels of the reference signals of the adjacent columns cancel out each other. When, however, the pixel signal levels are slightly different from each other, the influence is limited.

SUMMARY OF THE INVENTION

The present invention has been made in consideration of the above situation, and reduces the influence of distortion in a reference signal when A/D-converting pixel signals read out via adjacent column output lines.

According to the present invention, provided is an image sensor in which a first chip and a second chip are stacked comprising: a pixel unit in which a plurality of pixels are two-dimensionally arranged; a plurality of output lines each configured to output a pixel signal from the pixel unit; and an analog-digital converter provided for each of the plurality of output lines, the analog-digital converter comprising a first reference signal generation unit configured to generate a first reference signal, a first comparison unit configured to compare a signal level of a pixel signal output to a first output line of the plurality of output lines with a signal level of the first reference signal, a first counter configured to count until the signal level of the pixel signal coincides with the signal level of the first reference signal compared by the first comparison unit, a second reference signal generation unit configured to generate a second reference signal different from the first reference signal, a second comparison unit configured to compare a signal level of a pixel signal output to a second output line adjacent to the first output line of the plurality of output lines with a signal level of the second reference signal, and a second counter configured to count until the signal level of the pixel signal coincides with the signal level of the second reference signal compared by the second comparison unit, wherein the pixel unit is arranged in the first chip, and the analog-digital converter is arranged in the second chip.

Further, according to the present invention, provided is an image capturing apparatus comprising the image sensor as defined above.

Furthermore, according to the present invention, provided is a cellular phone comprising an image sensor as defined above.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
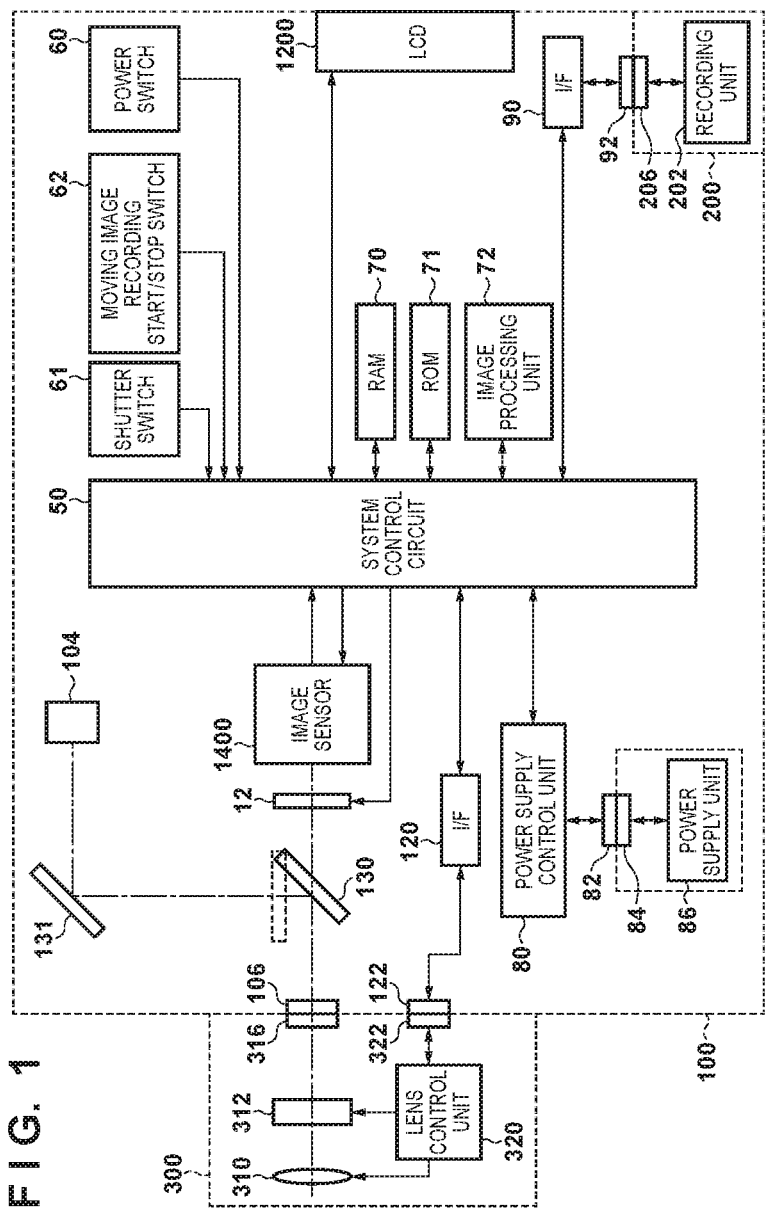
FIG. 1 is a block diagram showing a schematic arrangement of an image capturing apparatus according to a first embodiment of the present invention.

FIG. 1 is a block diagram showing the arrangement of an image capturing apparatus according to the first embodiment of the present invention. The image capturing apparatus basically includes an image processing apparatus 100, a recording medium 200 such as a memory card or hard disk, and a lens unit 300.

In the image processing apparatus 100, when a mirror 130 is on the optical axis, a user can check through an optical viewfinder 104 the composition of a still image to be captured by forming an image of incident light via the mirror 130 and a mirror 131. An image sensor 1400 includes column A/D circuits and a timing control block, which will be described later, and photoelectrically converts an optical image incident through the lens unit 300 into an electrical signal when the mirror 130 is withdrawn from the optical axis. A shutter 12 controls an exposure amount on the image sensor 1400. A system control circuit 50 (to be referred to as a "CPU" hereinafter) controls the overall image processing apparatus 100 including image processing.

A monitor 1200 is formed from a liquid crystal display (LCD) or the like, and can display a live view image and a captured still image. A shutter switch 61 is used to instruct to capture a still image, and has a two-stage arrangement. Pressing the shutter switch 61 halfway to the first stage will be referred to as halfway press, and fully pressing the shutter switch 61 to the second stage will be referred to as full press. When the shutter switch 61 is pressed halfway, automatic focus adjustment and automatic exposure control including setting of the shutter speed and f-number by an automatic exposure mechanism in a state before image capturing are performed. When the shutter switch 61 is fully pressed, the shutter 12 operates to perform an image capture operation. A moving image recording start/stop switch 62 is used to instruct recording of a moving image. When start of recording is instructed, a moving image recording operation is subsequently performed.

A power switch 60 switches between ON/OFF of the image processing apparatus 100. It is also possible to switch between ON/OFF of various attachments such as the lens unit 300, an external flash, and the recording medium 200 which are connected to the image processing apparatus 100.

A volatile memory (RAM) 70 temporarily records image data output from the image sensor 1400 and image data having undergone image processing by an image processing unit 72. The RAM 70 also functions as a work memory for the CPU 50. A nonvolatile memory (ROM) 71 stores a program executed when the CPU 50 operates. The image processing unit 72 performs processing of, for example, correcting/compressing a still image.

A power supply control unit 80 is constituted by a battery detection circuit, a DC-DC converter, a switch circuit for switching the block to be supplied with power. Furthermore, the power supply control unit 80 detects the presence/absence of a battery, the type of the battery, and the remaining battery amount, and controls the DC-DC converter based on the detection results and an instruction from the system control circuit 50 to supply a necessary voltage for a necessary period of time to each of the units including a recording medium. The power supply control unit 80 is connected to a power supply unit 86 via connectors 82 and 84. The power supply unit 86 includes a primary battery such as an alkaline battery or lithium battery, a secondary battery such as an Li battery, or an AC adaptor.

An interface 90 communicates with the recording medium 200 electrically connected via a connector 92. The recording medium 200 includes a recording unit 202 constituted by a semiconductor memory, a magnetic disk, or the like, and a connector 206 to the image processing apparatus 100.

An interface 120 communicates an electrical signal with the lens unit 300 electrically connected via a connector 122. A lens mount 106 mechanically connects the lens unit 300.

The lens unit 300 includes an image capturing lens 310, a stop 312, a lens mount 316, a lens control unit 320, and a connector 322. The lens mount 316 mechanically connects the lens unit 300 to the lens mount 106 of the image processing apparatus 100. The connector 322 is electrically connected to the image processing apparatus 100 via the connector 122 on the side of the image processing apparatus 100. The lens control unit 320 receives a signal from the image processing apparatus 100 via the connectors 322 and 122, and changes the position of the image capturing lens 310 on the optical axis based on the received signal, thereby performing focus adjustment. Similarly, the lens control unit 320 receives a signal from the image processing apparatus 100, and controls the aperture of the stop 312.

Figure 2:
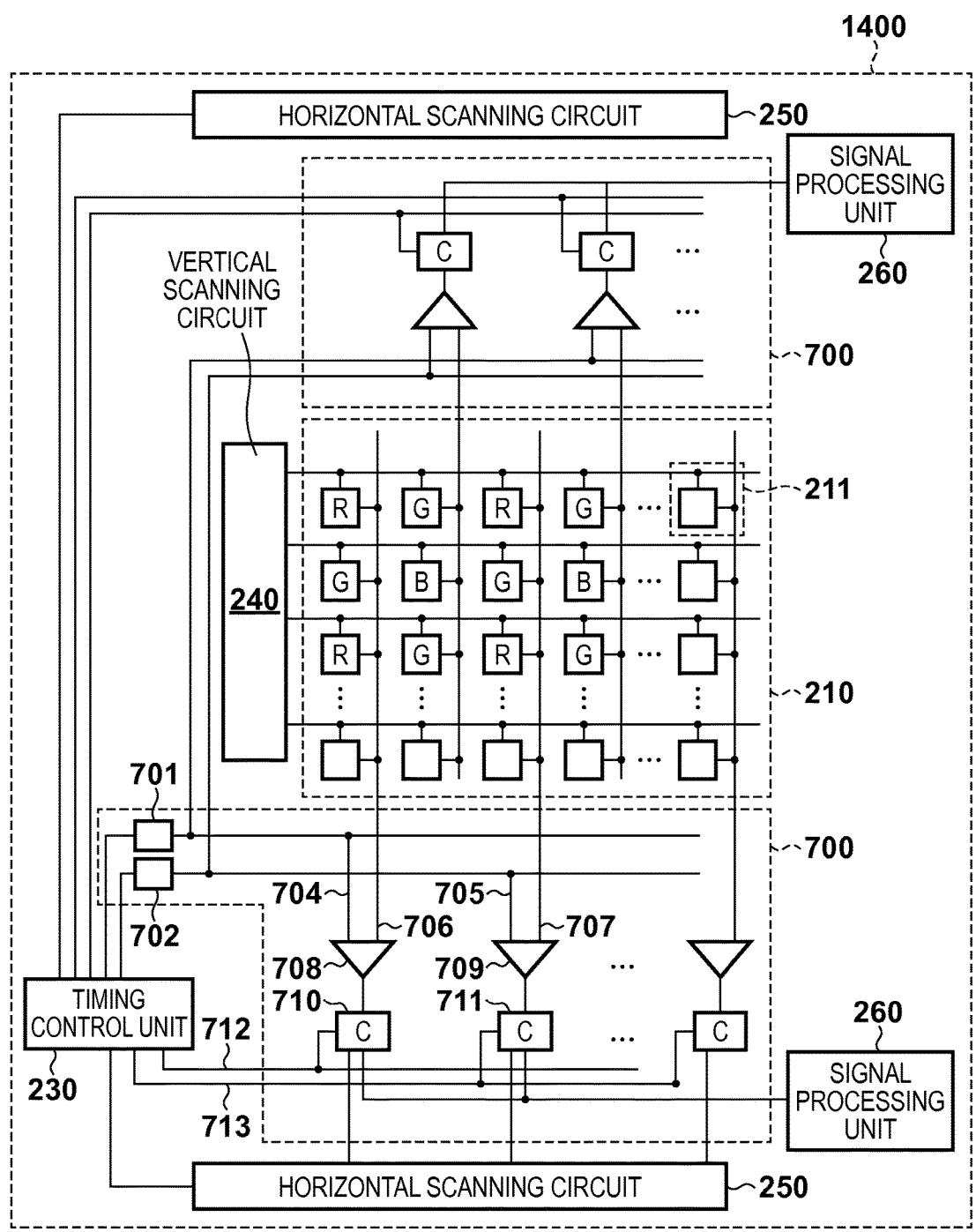
FIG. 2 is a block diagram showing an arrangement of an image sensor according to the first embodiment.

The arrangement of the image sensor 1400 according to the first embodiment will be described. FIG. 2 is a block diagram showing the arrangement of the image sensor 1400. The image sensor 1400 is mainly formed from a pixel unit 210, a column analog-digital conversion (A/D) circuit 700, a timing control unit 230, a vertical scanning circuit 240, horizontal scanning circuits 250, and signal processing units 260.

Figure 3:
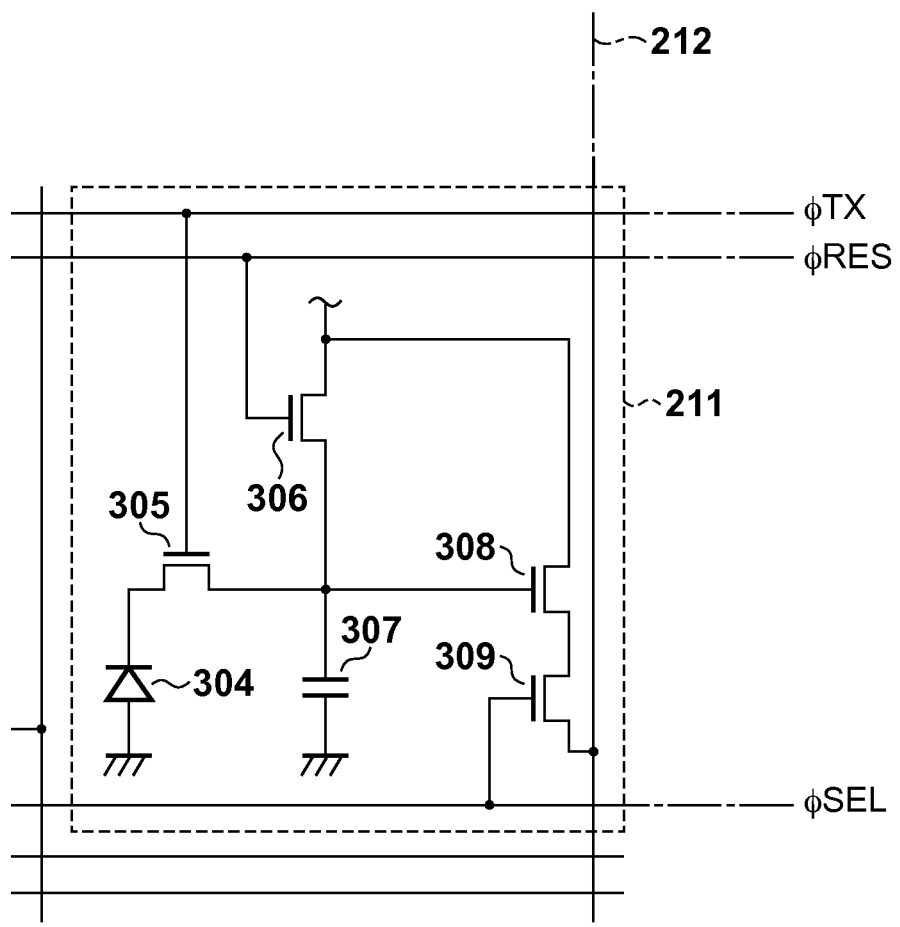
FIG. 3 is an equivalent circuit diagram of a pixel.

FIG. 3 is an equivalent circuit diagram of one pixel 211 of the pixel unit 210. Charges generated and accumulated by a photodiode 304 are transferred to a floating diffusion unit (FD) 307 by controlling a transfer signal φTX to operate a transfer switch 305. When a row selection switch 309 is turned on by a row selection signal φSEL, a source follower amplifier 308 amplifies a voltage signal based on the charges accumulated in the FD 307, and outputs the amplified signal as a pixel signal. The output pixel signal appears in a vertical output line (column output line) 212 via the row selection switch 309.

To reset unnecessary charges in the photodiode 304 and FD 307, a reset switch 306 is controlled by a reset signal φRES, and the transfer switch 305 is controlled by the transfer signal φTX, thereby executing a reset operation. The transfer signal φTX, the reset signal φRES, and the row selection signal φSEL are output when the CPU 50 controls the vertical scanning circuit 240 via the timing control unit 230, and supplied to the pixels 211 of each row via a signal line laid out for each row.

In the pixel unit 210, the plurality of pixels 211 having the above arrangement are two-dimensionally arranged. The A/D circuit 700 is arranged at one end of the vertical output line 212 of each column of the pixel unit 210. The column A/D circuit 700 according to the first embodiment includes comparators 708 and 709, counters 710 and 711, and reference signal generators 701 and 702. The comparators 708 and 709 are connected to the reference signal generators 701 and 702, respectively. The comparators 708 and 709 are alternately arranged for the respective columns.

The first reference signal (ramp signal) as an analog signal which is generated and output by the reference signal generator 701 and ramps up is input to one input terminal of the comparator 708 through a reference signal line 704. A vertical output line 706 is connected to the other input terminal of the comparator 708. The output of the comparator 708 is input to the counter 710.

The second reference signal (ramp signal) as an analog signal which is generated and output by the reference signal generator 702 is input to one input terminal of the comparator 709 through a reference signal line 705. A vertical output line 707 is connected to the other input terminal of the comparator 709. The output of the comparator 709 is input to the counter 711.

The timing control unit 230 is connected to the counters 710 and 711, the reference signal generators 701 and 702, and the horizontal scanning circuits 250. Different clock signal lines 712 and 713 are connected to the counters 710 and 711, respectively. The counters 710 and 711 are connected to the corresponding horizontal scanning circuits 250. Furthermore, the outputs of the counters 710 and 711 are connected to the corresponding signal processing unit 260.

Figure 4:
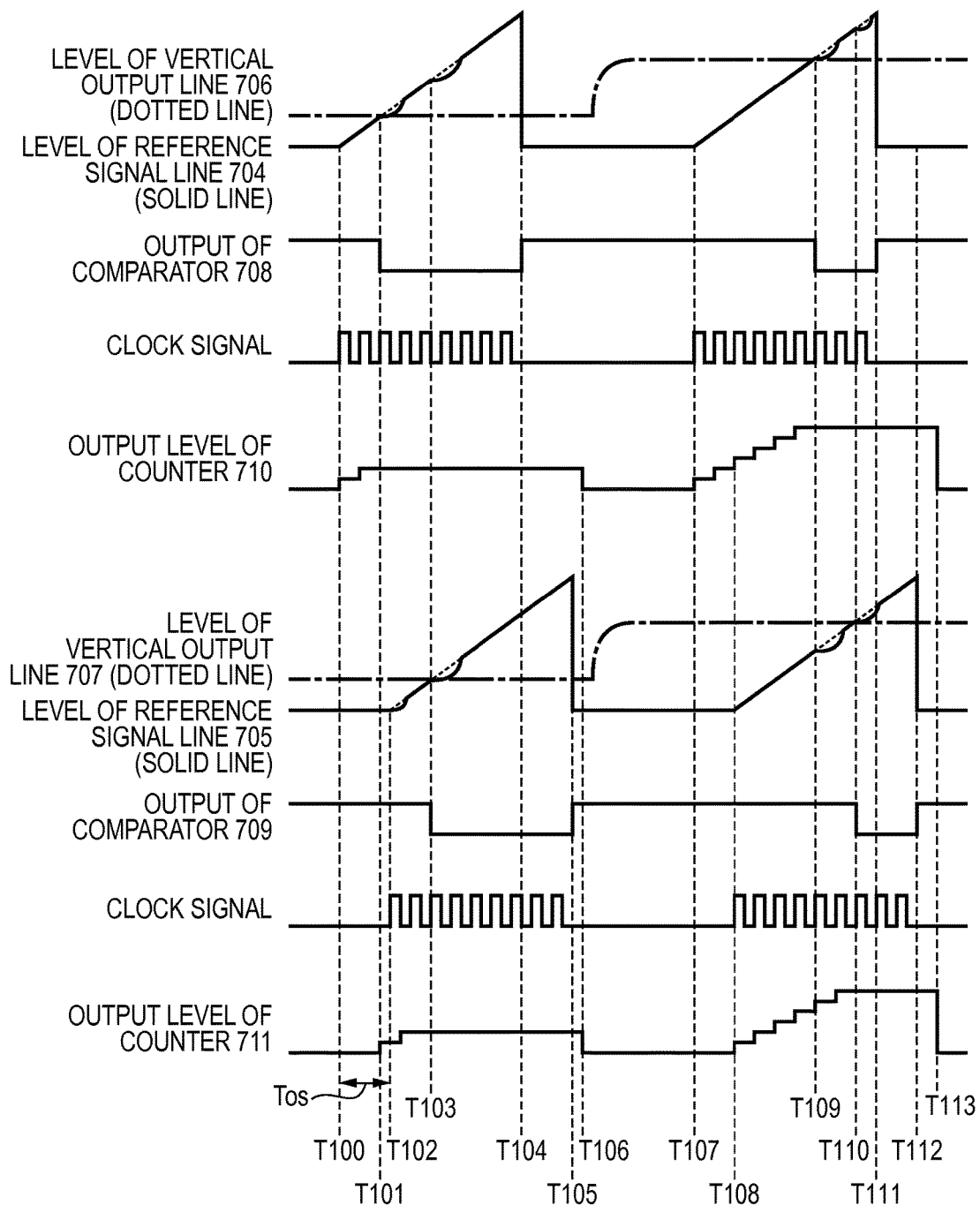
FIG. 4 is a timing chart showing an operation of a column A/D circuit according to the first embodiment.

FIG. 4 is a timing chart showing the operation of the column A/D circuit 700 according to the first embodiment. A case in which CDS (Correlated Double Sampling) processing is performed will be described.

Signals of a reset level are read out from the pixels 211 into the vertical output lines 706 and 707. At a timing T100, when the CPU 50 controls the timing control unit 230, the reference signal generator 701 starts outputting the ramp signal which ramps up the level of the reference signal within a predetermined signal level range. While the reference signal generator 701 outputs the ramp signal, the CPU 50 controls the timing control unit 230 to output a clock signal of a predetermined cycle to the counter 710, and the counter 710 counts the clock signal. The predetermined cycle is a cycle determined based on the output period of the ramp signal and the bit accuracy of a digital output. If, for example, the output period of the ramp signal is 256 µs and an output value having 8-bit accuracy is desirably output, it is necessary to count the clock signal 256 times, and thus the clock cycle is 1 µs.

At a timing T101, since the reset level of the vertical output line 706 coincides with the reference signal level, the output of the comparator 708 changes from high level to low level. Since the output of the comparator 708 functions to enable the counter 710, when the output is set to low level, the counter 710 stops.

On the other hand, at a timing T102 when an offset time Tos elapses, the CPU 50 controls the timing control unit 230 to cause the reference signal generator 702 to start outputting the ramp signal. While the reference signal generator 702 outputs the ramp signal, the CPU 50 controls the timing control unit 230 to output the clock signal of the predetermined cycle to the counter 711, and the counter 711 counts the clock signal. At a timing T103, since the reset level of the vertical output line 707 coincides with the reference signal level, the output of the comparator 709 changes from high level to low level. This stops the counter 711.

At a timing T104, since the reference signal line 704 reaches a saturation level to end the output of the ramp signal, the CPU 50 controls the timing control unit 230 to set the reference signal level to the initial value and return the output of the comparator 708 to high level. At the same time, the output of the clock signal to the counter 710 is stopped. Similarly, at a timing T105, since the reference signal line 705 reaches the saturation level to end the output of the ramp signal, the CPU 50 controls the timing control unit 230 to set the reference signal level to the initial value and return the output of the comparator 709 to high level. At the same time, the output of the clock signal to the counter 711 is stopped.

At a timing T106, the CPU 50 controls the timing control unit 230 to store the counter values of the reset level in the reset value memories of the counters 710 and 711, and reset the counters. After that, the signal levels are read out into the vertical output lines 706 and 707.

At a timing T107, to A/D-convert the signal level read out into the vertical output line 706, the CPU 50 controls the timing control unit 230 to cause the reference signal generator 701 to start outputting the ramp signal. While the reference signal generator 701 outputs the ramp signal, the CPU 50 controls the timing control unit 230 to output the clock signal of the predetermined cycle to the counter 710.

On the other hand, at a timing T108 when the offset time Tos elapses after the timing T107, to A/D-convert the signal level read out into the vertical output line 707, the CPU 50 controls the timing control unit 230 to cause the reference signal generator 702 to start outputting the ramp signal. While the reference signal generator 702 outputs the ramp signal, the CPU 50 controls the timing control unit 230 to output the clock signal of the predetermined cycle to the counter 711.

At a timing T109, since the signal level of the vertical output line 706 coincides with the reference signal level, the output of the comparator 708 changes from high level to low level. This stops the counter 710. Similarly, at a timing T110, since the signal level of the vertical output line 707 coincides with the reference signal level, the output of the comparator 709 changes from high level to low level. This stops the counter 711.

At a timing T111, since the reference signal line 704 reaches the saturation level to end the output of the ramp signal, the CPU 50 controls the timing control unit 230 to reset the reference signal level and return the output of the comparator 708 to high level. At the same time, the output of the clock signal to the counter 710 is stopped. Furthermore, at a timing T112, since the reference signal line 705 reaches the saturation level to end the output of the ramp signal, the CPU 50 controls the timing control unit 230 to reset the reference signal level and return the output of the comparator 709 to high level. At the same time, the output of the clock signal to the counter 711 is stopped.

At a timing T113, the CPU 50 controls the timing control unit 230 to obtain the difference between the counter value of the signal level and the value in the reset value memory. The CPU 50 controls the timing control unit 230 to drive the horizontal scanning circuits 250, thereby sending the difference value to the signal processing unit 260 for each column. The signal processing unit 260 performs signal processing for the input data, and outputs the processed signal to the CPU 50.

According to the first embodiment as described above, the output start timing of the ramp signal of the reference signal is shifted between adjacent comparators. Distortion in the level of the reference signal line 705 occurs at the timings T102 and T109 due to the influence of inversion of the comparator 708. However, the offset time Tos shifts the inversion timing of the comparator 709 from the timing of occurrence of the distortion, thereby reducing the influence. Similarly, distortion in the level of the reference signal line 704 occurs at the timings T103 and T110 due to the influence of inversion of the comparator 709. However, the offset time Tos shifts the inversion timing of the comparator 708 from the timing of occurrence of the distortion, thereby reducing the influence. Even if the reset level and signal level of each of the vertical output lines 706 and 707 are close to each other, it is possible to output a digital value at high accuracy.

Note that in the first embodiment, two different reference signals are supplied to two adjacent comparators. The present invention, however, is not limited to this. For example, three different reference signals may be supplied to three adjacent comparators, or four different reference signals may be supplied to four adjacent comparators.

In the example shown in FIG. 2, for the pixels 211 two-dimensionally arrayed, the vertical output lines are laid out for each column. The present invention, however, is not limited to this. As long as vertical output lines are laid out so as to output pixel signals from the pixels 211 to the outside of the pixel unit 210, the pixels 211 may be connected to a vertical output line by any unit.

Second Embodiment

The second embodiment of the present invention will be described. Note that the arrangements of an image capturing apparatus and an image sensor 1400 are the same as those in the above-described first embodiment and a description thereof will be omitted. In the second embodiment, a case in which reference signals to be input to adjacent comparators are set at different start levels will be explained.

Figure 5:
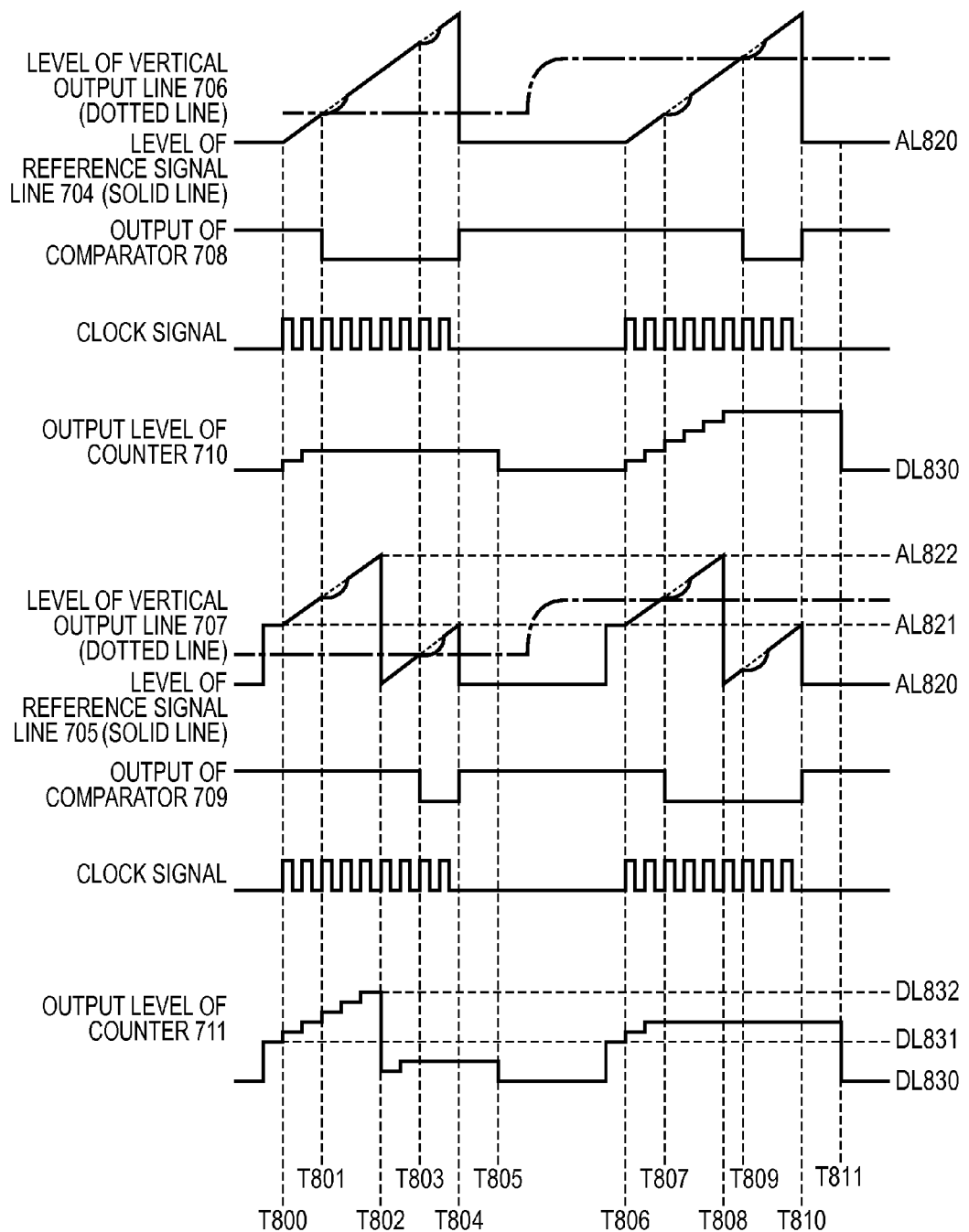
FIG. 5 is a timing chart showing an operation of a column A/D circuit according to a second embodiment.

FIG. 5 is a timing chart showing the operation of a column A/D circuit of the second embodiment in the image sensor having the arrangement shown in FIG. 2. Signals of a reset level are read out from pixels 211 into vertical output lines 706 and 707. At a timing T800, when a CPU 50 controls a timing control unit 230, a reference signal generator 701 starts outputting a ramp signal at an initial level AL820, and a reference signal generator 702 starts outputting a ramp signal at a ramp signal start level AL821. While the reference signal generators 701 and 702 respectively output the ramp signals, the CPU 50 controls the timing control unit 230 to output a clock signal of a predetermined cycle to each of counters 710 and 711. Each of the counters 710 and 711 starts counting at an output level corresponding to the reference signal level. That is, the counter 710 starts counting at a level DL830 corresponding to the level AL820, and the counter 711 starts counting at a level DL831 corresponding to the level AL821. After that, each of the counters 710 and 711 counts the clock signal.

At a timing T801, since the reset level of the vertical output line 706 coincides with the reference signal level, the output of a comparator 708 changes from high level to low level. This stops the counter 710.

At a timing T802, since a reference signal line 705 reaches a saturation level AL822, and a level equal to or lower than the level AL821 is to be output, the CPU 50 controls the timing control unit 230 to set the level to the level AL820. The output of the counter 711 is set at the level DL830 corresponding to the level AL820.

At a timing T803, since the reset level of the vertical output line 707 coincides with the reference signal level, the output of a comparator 709 changes from high level to low level. This stops the counter 711.

At a timing T804, the reference signal level has been changed within a predetermined range, and thus the CPU 50 controls the timing control unit 230 to stop outputting the clock signal to each of the counters 710 and 711. A reference signal line 704 and the reference signal line 705 are reset and the levels of the comparators 708 and 709 are returned to high level.

At a timing T805, the CPU 50 controls the timing control unit 230 to store the counter values of the reset level in the reset value memories of the counters 710 and 711, and reset the counters to the level DL830. After that, signal levels are read out into the vertical output lines 706 and 707.

At a timing T806, to A/D-convert the signal levels read out into the vertical output lines 706 and 707, the CPU 50 controls the timing control unit 230 to cause the reference signal generator 701 to start outputting the ramp signal at the initial level AL820. The reference signal generator 702 is caused to start outputting the ramp signal at the ramp signal start level AL821. While the reference signal generators 701 and 702 output the ramp signals, the CPU 50 controls the timing control unit 230 to output the clock signal of the predetermined cycle to each of the counters 710 and 711. Each of the counters 710 and 711 starts counting at an output level corresponding to the reference signal level. That is, the counter 710 starts counting at the level DL830 corresponding to the level 820, and the counter 711 starts counting at the level DL831 corresponding to the level AL821. After that, each counter counts the clock signal.

At a timing T807, the signal level of the vertical output line 707 coincides with the reference signal level, and the output of a comparator 709 changes from high level to low level. This stops the counter 711.

At a timing T808, since the reference signal line 705 reaches the saturation level AL822, and then outputs a level equal to or lower than the level AL821, the CPU 50 controls the timing control unit 230 to reset the level to the level AL820. The output of the counter 711 is set at the level DL830 corresponding to the level AL820.

At a timing T809, since the signal level of the vertical output line 706 coincides with the reference signal level, the output of the comparator 708 changes from high level to low level. This stops the counter 710.

At a timing T810, the reference signal level has been changed within a predetermined range, and thus the CPU 50 controls the timing control unit 230 to stop outputting the clock signal to the counter 711. The reference signal lines 704 and 705 are reset and the output levels of the comparators 708 and 709 are returned to high level.

At a timing T811, the CPU 50 controls the timing control unit 230 to obtain the difference between the counter value of the signal level and the value in the reset value memory. The CPU 50 controls the timing control unit 230 to drive horizontal scanning circuits 250, thereby sending the difference value to a signal processing unit 260 for each column. The signal processing unit 260 performs signal processing for the input data, and outputs the processed data to the CPU 50.

According to the second embodiments described above, the start level of the reference signal is different between adjacent comparators. Distortion in the level of the reference signal line 705 occurs at the timings T801 and T809 due to the influence of inversion of the comparator 708. Since, however, there is the offset AL821 in the reference signal level, the inversion timing of the comparator 709 shifts from the timing of occurrence of the distortion, thereby reducing the influence. Similarly, distortion in the level of the reference signal line 704 occurs at the timings T803 and T807 due to the influence of inversion of the comparator 709. Since, however, there is the offset AL821 in the reference signal level, the inversion timing of the comparator 708 shifts from the timing of occurrence of the distortion, thereby reducing the influence. Consequently, even if the reset level and signal level of each of the vertical output lines 706 and 707 are close to each other, it is possible to output a digital value at high accuracy.

Third Embodiment

The third embodiment of the present invention will be described. Note that the arrangements of an image capturing apparatus and an image sensor 1400 are the same as those in the above-described first embodiment and a description thereof will be omitted. In the third embodiment, a case in which the gradients of reference signals to be input to adjacent comparators are different will be explained.

Figure 6:
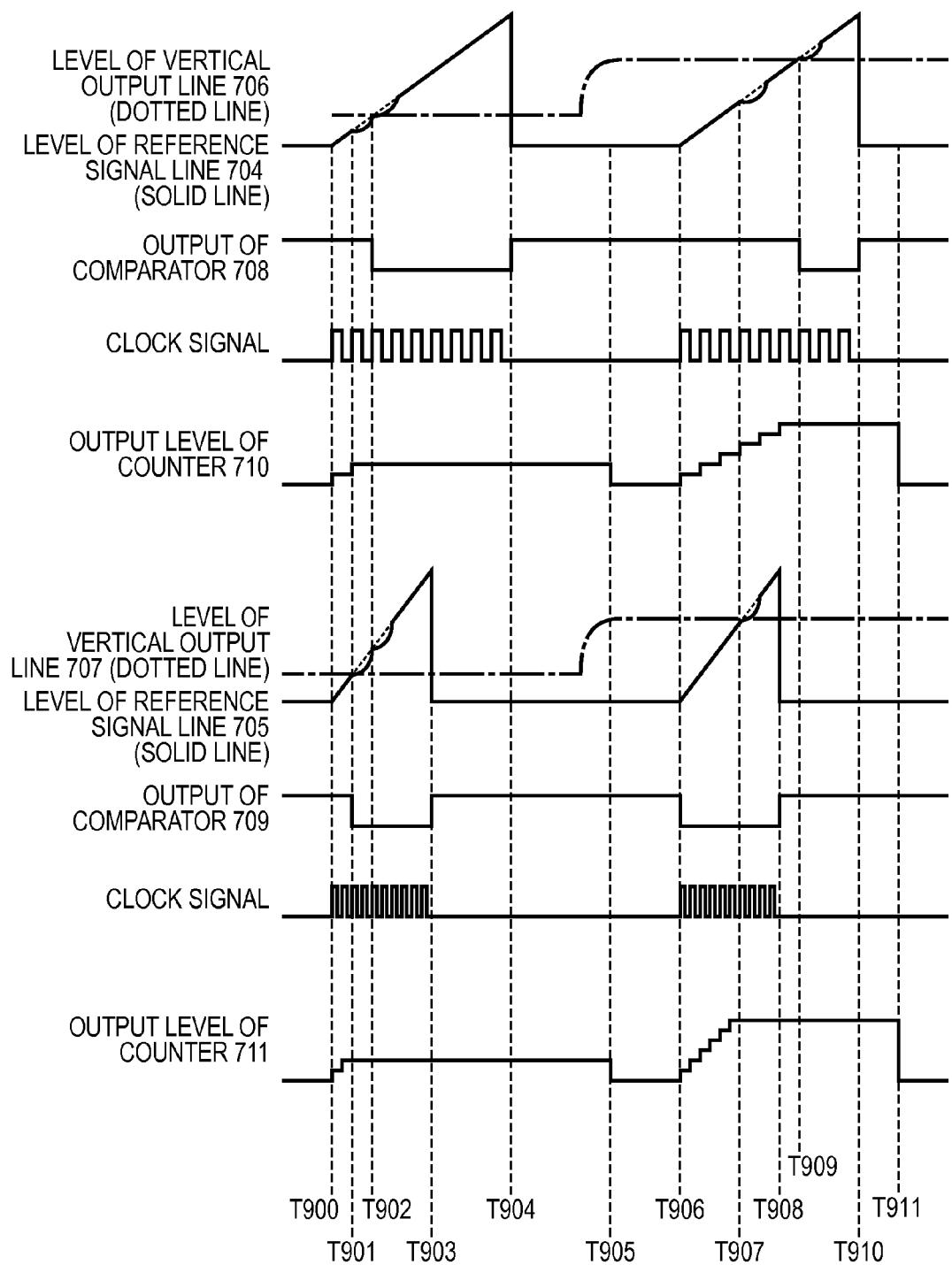
FIG. 6 is a timing chart showing an operation of a column A/D circuit according to a third embodiment.

FIG. 6 is a timing chart showing the operation of a column A/D circuit of the third embodiment in the image sensor having the arrangement shown in FIG. 2. Signals of a reset level are read out from pixels 211 into vertical output lines 706 and 707. At a timing T900, when a CPU 50 controls a timing control unit 230, reference signal generators 701 and 702 respectively start outputting ramp signals at the same initial level. In the third embodiment, the rate of change of the ramp signal output from the reference signal generator 702 is set higher than that of the ramp signal output from the reference signal generator 701. While the reference signal generator 701 outputs the ramp signal, the CPU 50 controls the timing control unit 230 to output a clock signal of a predetermined cycle to a counter 710. While the reference signal generator 702 outputs the ramp signal, the CPU 50 controls the timing control unit 230 to output, to a counter 711, a clock signal of a cycle shorter than that of the clock output to the counter 710. If, for example, the rate of change of the ramp signal output from the reference signal generator 702 is twice higher than that of the ramp signal from the reference signal generator 701, the clock signal whose frequency is twice higher than that for the counter 711 is output to the counter 710. The counters 710 and 711 count the clock signals, respectively.

At a timing T901, since the reset level of the vertical output line 707 coincides with the reference signal level, the output of a comparator 709 changes from high level to low level. This stops the counter 711. At a timing T902, since the reset level of the vertical output line 706 coincides with the reference signal level, the output of a comparator 708 changes from high level to low level. This stops the counter 710.

At a timing T903, the reference signal generator 702 has changed the reference signal level within a predetermined range, and thus the CPU 50 controls the timing control unit 230 to stop outputting the clock signal to the counter 711. A reference signal line 705 is reset and the level of the comparator 709 is returned to high level. At a timing T904, the reference signal generator 701 has changed the reference signal level within a predetermined range, and thus the CPU 50 controls the timing control unit 230 to stop outputting the clock signal to the counter 710. A reference signal line 704 is reset and the level of the comparator 708 is returned to high level.

At a timing T905, the CPU 50 controls the timing control unit 230 to store the counter values of the reset level in the reset value memories of the counters 710 and 711, and reset the counters. After that, signal levels are read out into the vertical output lines 706 and 707.

At a timing T906, to A/D-convert the signal levels read out into the vertical output lines 706 and 707, the CPU 50 controls the timing control unit 230 to drive the reference signal generators 701 and 702 as in a case in which the reset level is read out. The clock signals and the counters 710 and 711 are driven as in a case in which the reset level is read out.

At a timing T907, since the signal level of the vertical output line 707 coincides with the reference signal level, the output of the comparator 709 changes from high level to low level. This stops the counter 711.

At a timing T908, the reference signal generator 702 has changed the reference signal level within the predetermined range, and thus the CPU 50 controls the timing control unit 230 to stop outputting the clock signal to the counter 711. The reference signal line 705 is reset and the output level of the comparator 709 is returned to high level.

At a timing T909, since the signal level of the vertical output line 706 coincides with the reference signal level, the output of the comparator 708 changes from high level to low level. This stops the counter 710.

At a timing T910, the reference signal generator 701 has changed the reference signal level within the predetermined range, and thus the CPU 50 controls the timing control unit 230 to stop outputting the clock signal to the counter 710. The reference signal line 704 is reset and the output level of the comparator 708 is returned to high level.

At a timing T911, the CPU 50 controls the timing control unit 230 to obtain the difference between the counter value of the signal level and the value in the reset value memory. The CPU 50 controls the timing control unit 230 to drive horizontal scanning circuits 250, thereby sending the difference value to a signal processing unit 260 for each column. The signal processing unit 260 performs signal processing for the input data, and outputs the processed data to the CPU 50.

Note that the third embodiment and the above-described first embodiment may be combined. If, for example, inversion is expected at a low level such as the reset level, the start of the reference signal generator 702 is delayed so that the output of the ramp signal of the reference signal generator 702 ends in synchronism with the timing at which the output of the ramp signal of the reference signal generator 701 ends. This control operation can more reliably avoid distortion in the comparator at the time of detection of the reset level.

According to the third embodiment as described above, the rate of change of reference signals are different between adjacent comparators. Although distortion in the level of the reference signal line 705 occurs at the timing T902 due to the influence of inversion of the comparator 708, the inversion timing of the comparator 709 shifts, thereby reducing the influence. Similarly, although distortion in the level of the reference signal line 704 occurs at the timings T901 and T907 due to the influence of inversion of the comparator 709, the inversion timing of the comparator 708 shifts, thereby reducing the influence. In the third embodiment, even at the same signal level, the difference between the inversion timings of the comparators 708 and 709 becomes larger as the signal level is higher. Especially at the signal level, at the timing T909 at which the comparator 708 inverts the output, the reference signal generator 702 has ended outputting the ramp signal, thereby reducing the influence. Even if the reset level and signal level of each of the vertical output lines 706 and 707 are close to each other, it is possible to output a digital value at high accuracy.

Fourth Embodiment

The fourth embodiment of the present invention will be described. Note that the arrangements of an image capturing apparatus and an image sensor 1400 are the same as those in the above-described first embodiment and a description thereof will be omitted. In the fourth embodiment, a case in which a reference signal to be input to one of adjacent comparators increases and a reference signal to be input to the other comparator decreases will be explained.

Figure 7:
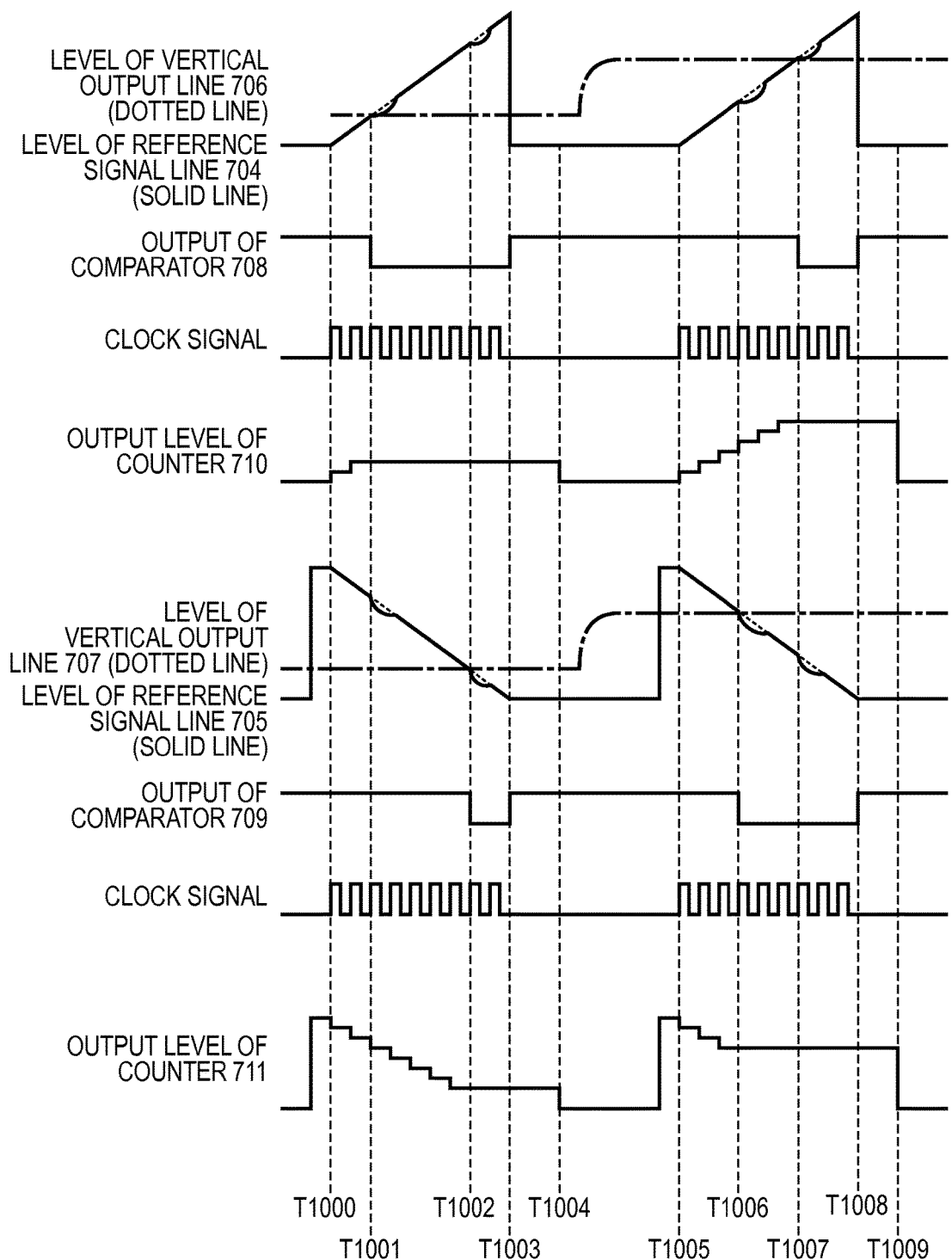
FIG. 7 is a timing chart showing an operation of a column A/D circuit according to a fourth embodiment.

FIG. 7 is a timing chart showing the operation of a column A/D circuit of the fourth embodiment in the image sensor having the arrangement shown in FIG. 2. Signals of a reset level are read out from pixels 211 into vertical output lines 706 and 707. At a timing T1000, when a CPU 50 controls a timing control unit 230, a reference signal generator 701 starts outputting a ramp signal at an initial level. That is, the ramp signal output from the reference signal generator 701 increases. While the reference signal generator 701 outputs the ramp signal, the CPU 50 controls the timing control unit 230 to output a clock signal of a predetermined cycle to a counter 710. The counter 710 counts up the clock signal. On the other hand, a ramp signal output from a reference signal generator 702 decreases. The output start level of the ramp signal output from the reference signal generator 702 is set to a saturation level, and the counter output level is set to an output corresponding to the saturation level. While the reference signal generator 702 outputs the ramp signal, the CPU 50 controls the timing control unit 230 to output the clock signal of the predetermined cycle to a counter 711. The counter 711 counts down the clock signal.

At a timing T1001, since the reset level of the vertical output line 706 coincides with the reference signal level, the output of a comparator 708 changes from high level to low level. This stops the counter 710. At a timing T1002, since the reset level of the vertical output line 707 coincides with the reference signal level, the output of a comparator 709 changes from high level to low level. This stops the counter 711.

At a timing T1003, each of the reference signal generators 701 and 702 has changed the reference signal level within a predetermined range, and thus the CPU 50 controls the timing control unit 230 to stop outputting the clock signal to each of the counters 710 and 711. A reference signal line 704 is reset and the output levels of the comparators 708 and 709 are returned to high level.

At a timing T1004, the CPU 50 controls the timing control unit 230 to store the counter values of the reset level in the reset value memories of the counters 710 and 711, and reset the counters. After that, signal levels are read out into the vertical output lines 706 and 707.

At a timing T1005, to A/D-convert the signal levels read out into the vertical output lines 706 and 707, the CPU 50 controls the timing control unit 230 to drive the reference signal generators 701 and 702 as in a case in which the reset level is read out. The clock signals and the counters 710 and 711 are driven as in a case in which the reset level is read out.

At a timing T1006, since the signal level of the vertical output line 707 coincides with the reference signal level, the output of the comparator 709 changes from high level to low level. This stops the counter 711. At a timing T1007, since the signal level of the vertical output line 706 coincides with the reference signal level, the output of the comparator 708 changes from high level to low level. This stops the counter 710.

At a timing T1008, each of the reference signal generators 701 and 702 has changed the reference signal level within the predetermined range, and thus the CPU 50 controls the timing control unit 230 to stop outputting the clock signal to each of the counters 710 and 711. A reference signal line 704 is reset and the output levels of the comparators 708 and 709 are returned to high level.

At a timing T1009, the CPU 50 controls the timing control unit 230 to obtain the difference between the counter value of the signal level and the value in the reset value memory. The CPU 50 controls the timing control unit 230 to drive horizontal scanning circuits 250, thereby sending the difference value to a signal processing unit 260 for each column. The signal processing unit 260 performs signal processing for the input data, and outputs the processed data to the CPU 50.

According to the fourth embodiment as described above, the increase/decrease of a reference signal is opposite between adjacent comparators. Although distortion in the level of the reference signal line 705 occurs at the timings T1001 and T1007 due to the influence of inversion of the comparator 708, decreasing the ramp signal shifts the inversion timing of the comparator 709 from the timing of occurrence of the distortion, thereby reducing the influence. Similarly, although distortion in the level of the reference signal line 704 occurs at the timings T1002 and T1006 due to the influence of inversion of the comparator 709, decreasing the ramp signal shifts the inversion timing of the comparator 708 from the timing of occurrence of the distortion, thereby reducing the influence. Since the inversion timings of the comparators are different when the outputs of the pixels are small or large, it is possible to reduce the influence of distortion in a signal caused by inversion of a comparator, thereby outputting a digital value at high accuracy.

Fifth Embodiment

The fifth embodiment of the present invention will be described. In the fifth embodiment, a case will be explained in which when the start levels of reference signals to be input to adjacent comparators are different as in the second embodiment, one control line connects a timing control unit 230 and counters to perform driving.

Figure 8:
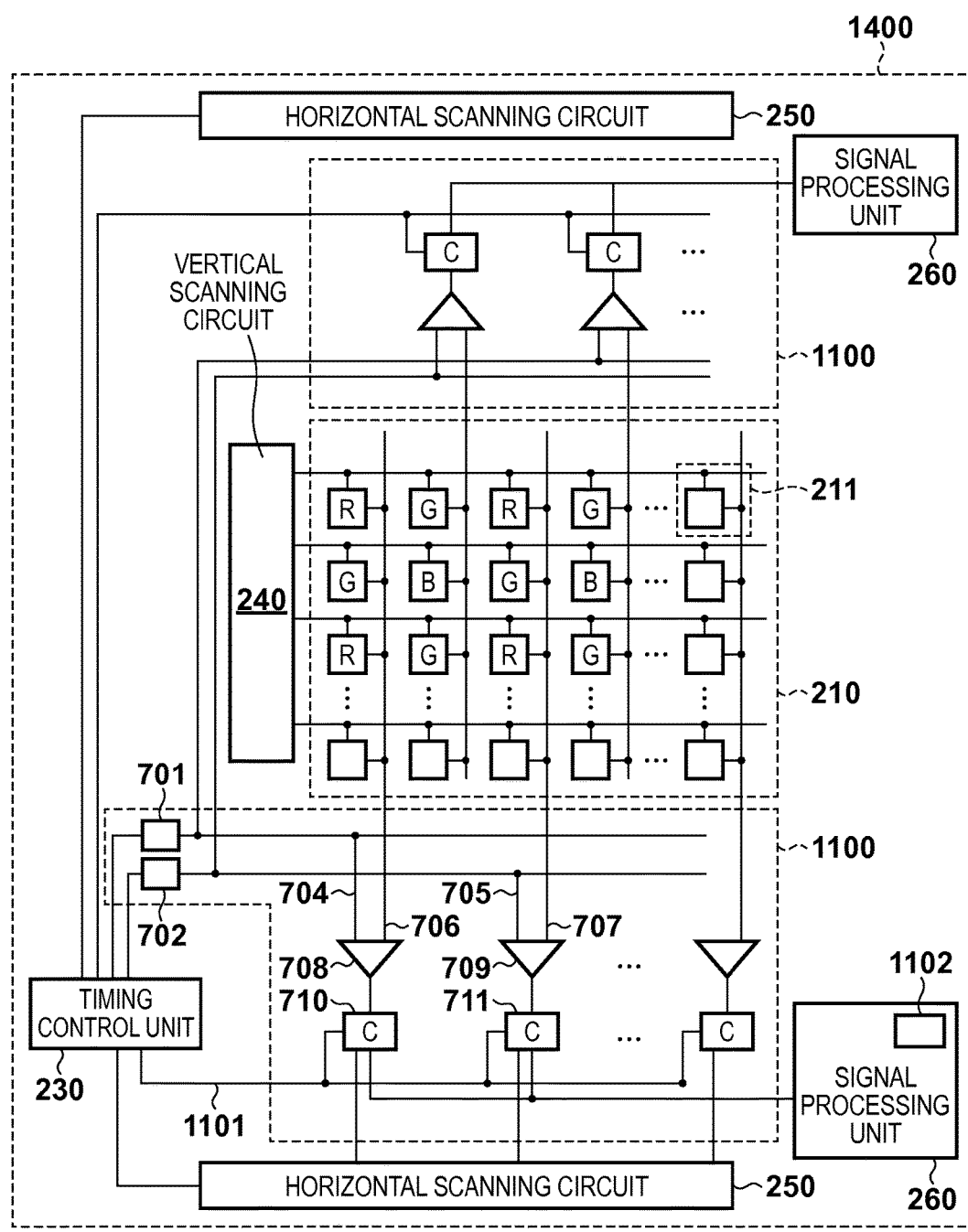
FIG. 8 is a block diagram showing an arrangement of an image sensor according to a fifth embodiment.

FIG. 8 shows the circuit arrangement of an image sensor 1400 according to the fifth embodiment. Note that the same reference numerals as those in FIG. 2 denote the same components and a description thereof will be omitted. The difference from the circuit arrangement shown in FIG. 2 is a portion of a control line 1101 connecting to the timing control unit 230 and counters 710 and 711 of a column A/D circuit 1100 and a calculation unit 1102 provided in a signal processing unit 260. In the arrangement shown in FIG. 2, the timing control unit 230 and the counter 710 are connected by a clock signal line 712, and the timing control unit 230 and the counter 711 are connected by a clock signal line 713. Therefore, different counter start levels and clock cycles can be set in the counters 710 and 711. On the other hand, in the circuit arrangement shown in FIG. 8, all the counters are controlled by a common control signal through the control line 1101. Therefore, even if different reference signals are input to adjacent comparators, the same counter driving is performed.

Figure 9:
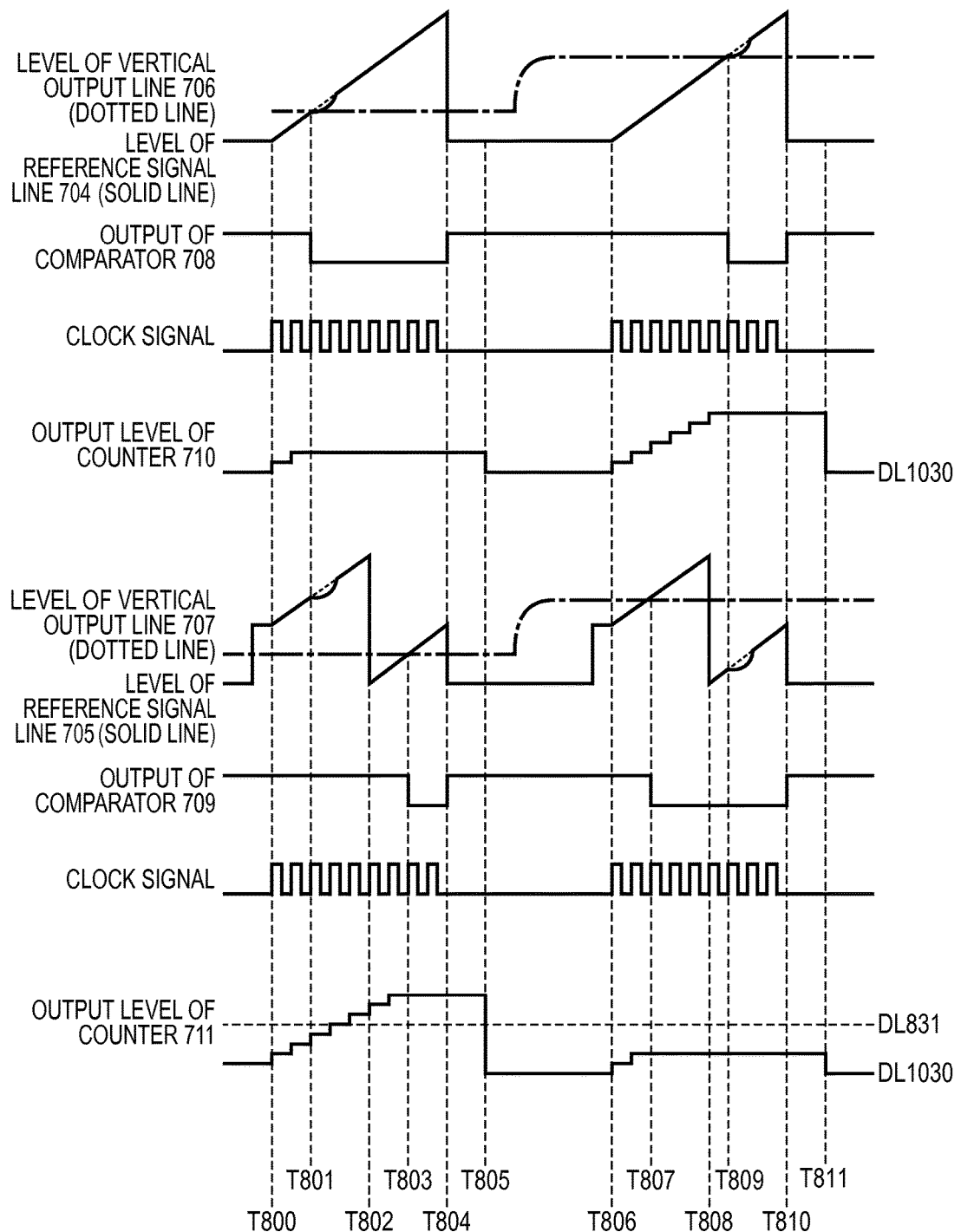
FIG. 9 is a timing chart showing an operation of a column A/D circuit according to the fifth embodiment.

FIG. 9 shows the driving timing of the column A/D circuit 1100 according to the fifth embodiment. Assume that the timings of the signal levels of vertical output lines 706 and 707, the ramp signal levels, and input clocks to be input are the same as those shown in FIG. 5, and the inversion timings of the comparators 708 and 709 are the same as those shown in FIG. 5. The difference from the second embodiment is that the count start level of the counter 711 is the level DL 831 in the second embodiment but both the count start levels of the counters 710 and 711 are a level DL1030 in the fifth embodiment. The clock cycles of the clocks supplied to the counters 710 and 711 and the clock operation periods are the same as those shown in FIG. 5. Consequently, the counters 710 and 711 operate without any problem even if only one control line 1101 is used. Note that since the output of the counter 711 is different from a value to be obtained if the counter 711 is operated in the conventional manner, the calculation unit 1102 performs calculation to convert the output of the counter 711 into an appropriate value corresponding to the level of the reference signal when the output of the comparator 709 is inverted, and then outputs the converted value to a CPU.

Calculation performed by the calculation unit 1102 is as follows. A digital value at a counter start level DL831 in the second embodiment is added to the output of the counter 711 during the reference signal output periods from the timing T800 to the timing T802 and from the timing T806 to the timing T808. A digital value obtained by subtracting the level DL831 from a maximum value DL832 of the counter 711 is added to the output of the counter 711 during the reference signal output period from the timing T802 to the timing T804 and from the timing T808 to the timing T810.

The image sensor 1400 having the arrangement shown in FIG. 8 is applicable to the first and fourth embodiments. In this case, the calculation unit 1102 need only convert the value of the counter 711 according to a method of operating each reference signal.

According to the fifth embodiment as described above, in addition to the same effects as those in the first, second, and fourth embodiments, it is possible to decrease the number of control lines connected to the counters, thereby decreasing the chip area of the image sensor.

Sixth Embodiment

The sixth embodiment of the present invention will be described. In the sixth embodiment, an example of the arrangement of a column A/D circuit when an image sensor 1400 has a stacked structure will be explained.

Figure 10A:
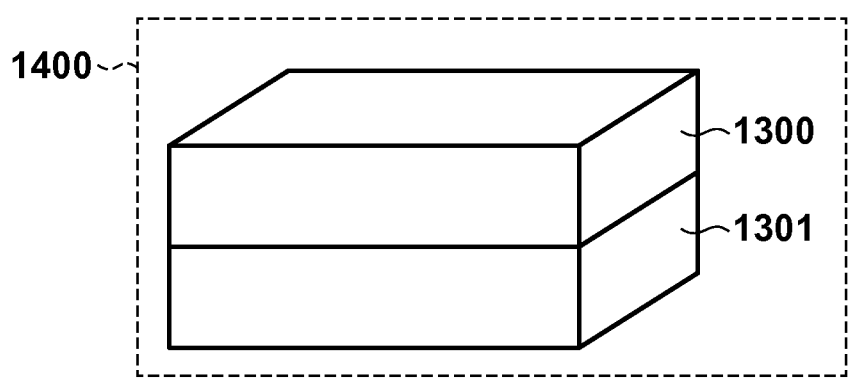
FIGS. 10A and 10B are schematic views each showing an image sensor with a stacked structure according to a sixth embodiment.
Figure 10B:
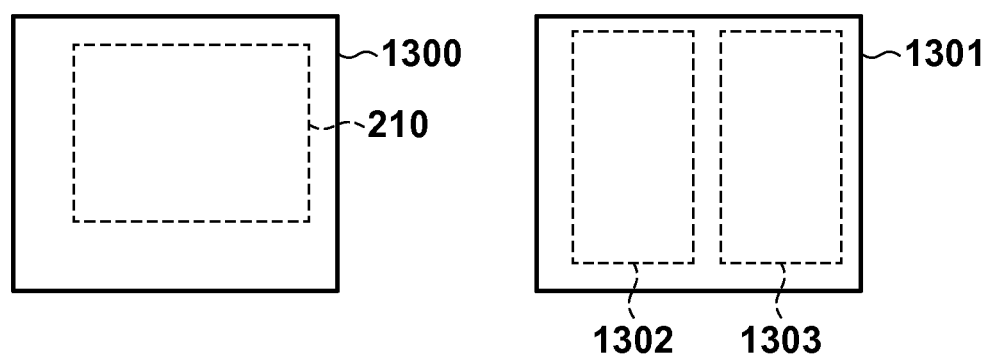

As shown in FIG. 10A, the image sensor 1400 of the sixth embodiment is obtained by stacking an image sensor semiconductor chip 1300 and a high-speed logic process semiconductor chip 1301 at a chip level. FIG. 10A is a perspective view and FIG. 10B is a plan view showing each chip. The image sensor semiconductor chip 1300 includes a region including a pixel unit 210. The high-speed logic process semiconductor chip 1301 includes a portion, such as a column A/D circuit and horizontal scanning circuit, capable of performing high-speed processing on digital data.

Figure 11:
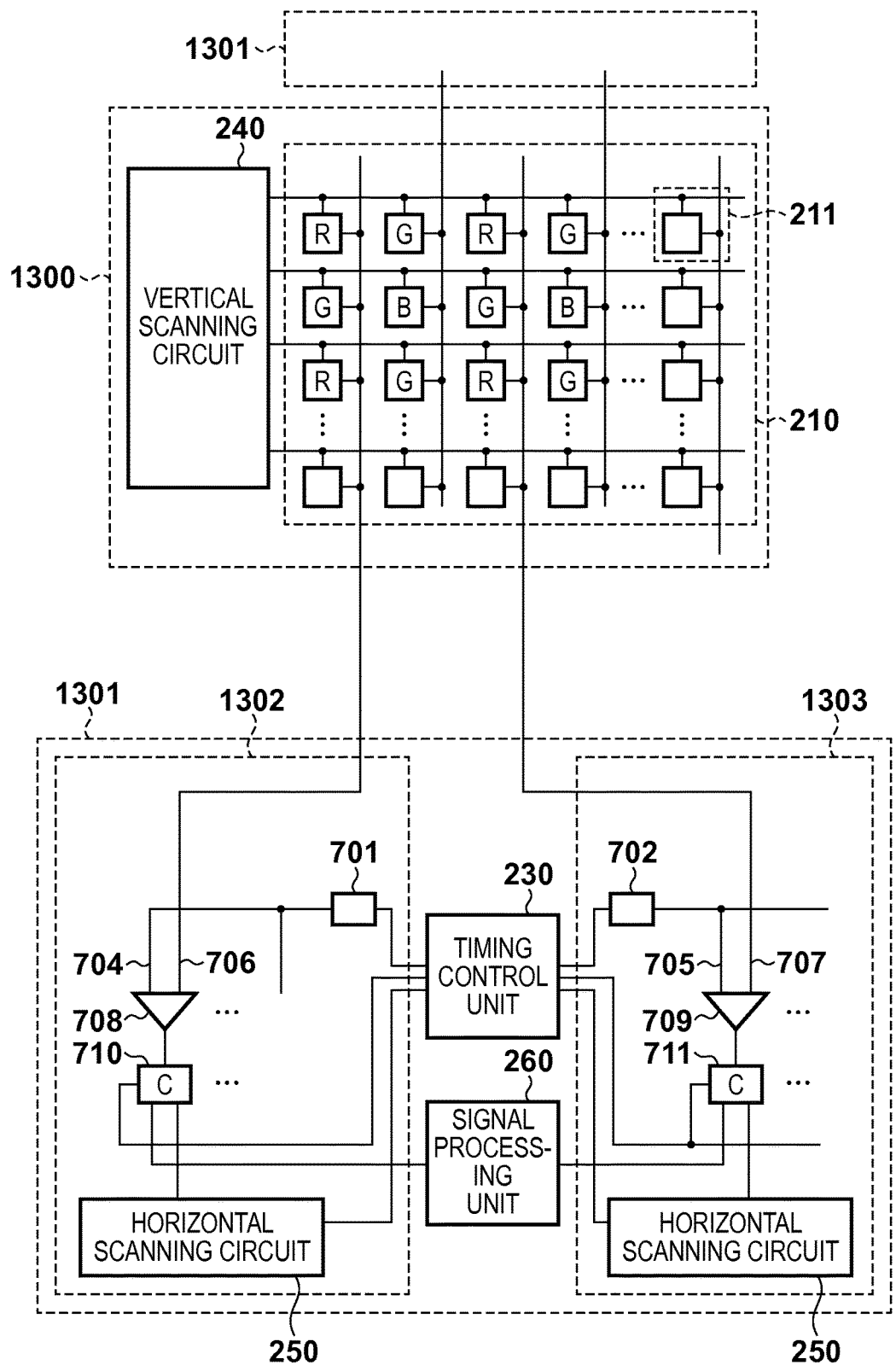
FIG. 11 is a block diagram showing an arrangement of the image sensor according to the sixth embodiment.

FIG. 11 shows the circuit arrangement of the image sensor 1400 according to the sixth embodiment. The difference from the circuit arrangement described in the fifth embodiment is the arrangement of the column A/D circuit. In the sixth embodiment, a reference signal generator 701, a comparator 708, a counter 710, and horizontal scanning circuits 250 and wirings for connecting these components constitute a column A/D block 1302. A reference signal generator 702, a comparator 709, a counter 711, and horizontal scanning circuits 250, and wirings for connecting these components constitute a column A/D block 1303. By arranging the column A/D blocks 1302 and 1303 in the high-speed logic process semiconductor chip 1301 so as not to influence each other, the influence of distortion in a reference signal caused by inversion of a comparator is reduced.

Note that in the example shown in FIG. 11, both the column A/D blocks 1302 and 1303 are provided in the high-speed logic process semiconductor chip 1301. The present invention, however, is not limited to this. For example, the column A/D block 1302 may be provided in the image sensor semiconductor chip 1300 and the column A/D block 1303 may be provided in the high-speed logic process semiconductor chip 1301.

According to the sixth embodiment as described above, in an image sensor with a stacked structure, column A/D blocks in which different reference signals are input to adjacent comparators, as in the first to fifth embodiments, are arranged at a given distance so that the influence of signal distortion caused by the inversion timing becomes small. This makes it possible to output a digital value at higher accuracy in the image sensor with the stacked structure.

Seventh Embodiment

Figure 12:
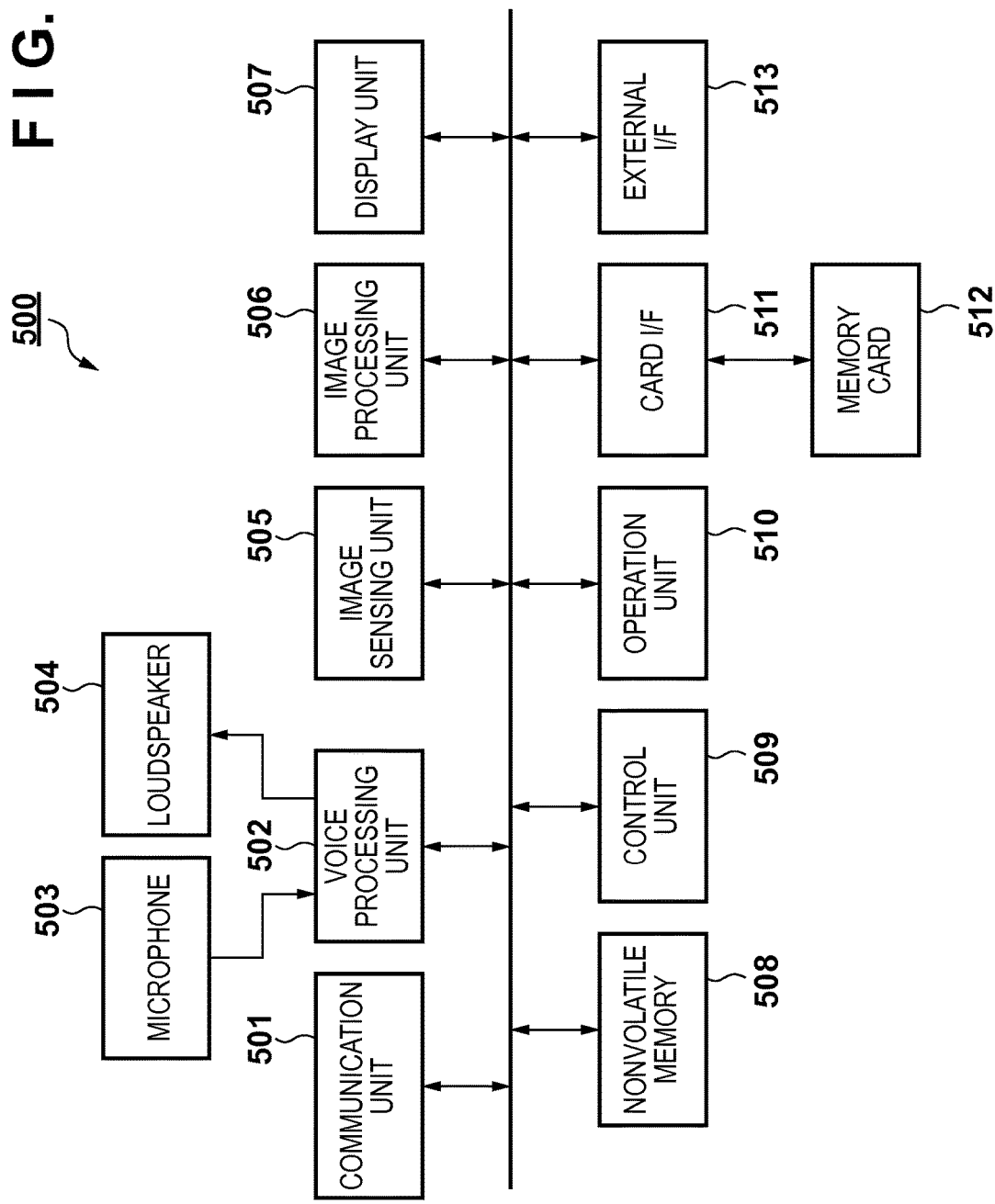
FIG. 12 is a block diagram showing a schematic arrangement of a cellular phone according to a seventh embodiment.

FIG. 12 is a block diagram showing an arrangement of a cellular phone 500 according to the seventh embodiment of the present invention. The cellular phone 500 according to the seventh embodiment has the e-mail function, Internet connection function, image shooting/playback function, and the like, in addition to the voice communication function.

In FIG. 12, a communication unit 501 communicates voice data and image data with another phone by a communication method complying with a communication carrier with which the user has a contract. In voice communication, a voice processing unit 502 converts voice data from a microphone 503 into a format suited for origination, and sends the converted data to the communication unit 501. Also, the voice processing unit 502 decodes voice data from a call destination that has been sent from the communication unit 501, and sends the decoded data to a loudspeaker 504.

An image sensing unit 505 includes the image sensor 1400 described in one of the first and sixth embodiments, shoots an image of an object, and outputs image data. At the time of shooting an image, an image processing unit 506 processes image data shot by the image sensing unit 505, converts the data into a format suited for recording, and outputs the converted data. At the time of playing back a recorded image, the image processing unit 506 processes the image to be played back, and sends the processed image to a display unit 507. The display unit 507 includes a liquid crystal display panel about several inches in size, and displays various display contents in accordance with instructions from a control unit 509. A nonvolatile memory 508 stores information of an address book, and data such as data of e-mail and image data shot by the image sensing unit 505.

The control unit 509 includes a CPU and memory, and controls the respective units of the cellular phone 500 in accordance with a control program stored in the memory (not shown). An operation unit 510 includes a power button, number keys, and various other operation keys used to input data by the user. A card I/F 511 records and reads out various data on and from a memory card 512. An external I/F 513 transmits, to an external device, data stored in the nonvolatile memory 508 and memory card 512, and receives data transmitted from an external device. The external I/F 513 performs communication by a well-known communication method such as wireless communication or a wired communication method conforming to, for example, a USB standard.

Next, the voice communication function in the cellular phone 500 will be explained. When calling a call destination, the user operates the number keys of the operation unit 510 to input the number of the call destination, or operates to display, on the display unit 507, an address book stored in the nonvolatile memory 508, selects the call destination, and instructs origination. When the origination is instructed, the control unit 509 originates a call to the call destination via the communication unit 501. If the call destination answers the call, the communication unit 501 outputs voice data of the destination to the voice processing unit 502, and also transmits voice data of the user to the destination.

When transmitting an e-mail, the user instructs creation of a mail by using the operation unit 510. When the creation of a mail is instructed, the control unit 509 displays a mail creation screen on the display unit 507. The user inputs a transmission destination address and body by using the operation unit 510, and instructs transmission. When transmission of the mail is instructed, the control unit 509 sends address information and data of the mail body to the communication unit 501. The communication unit 501 converts the mail data into a format suited for communication, and sends the converted data to the transmission destination. When the communication unit 501 receives an e-mail, it converts the received mail data into a format suited for display, and displays the converted data on the display unit 507.

Next, the image shooting function in the cellular phone 500 will be explained. When the user operates the operation unit 510 to set the shooting mode and then instructs shooting of a still image or moving image, the image sensing unit 505 performs shooting and sends the shot still image data or moving image data to the image processing unit 506. The image processing unit 506 processes the shot still image data or moving image data, and stores the processed data in the nonvolatile memory 508. The image processing unit 506 sends the obtained still image data or moving image data to the card I/F 511. The card I/F 511 stores the still image data or moving image data in the memory card 512.

The cellular phone 500 can transmit, as a file attached to an e-mail, a file including still image data or moving image data shot in this manner. More specifically, when transmitting an e-mail, an image file stored in the nonvolatile memory 508 or memory card 512 is selected, and transmission of the image file as an attached file is instructed.

The cellular phone 500 can also transmit a file including shot still image data or moving image data to an external device such as a PC or another phone via the external I/F 513. The user selects an image file stored in the nonvolatile memory 508 or memory card 512 and instructs transmission, by operating the operation unit 510. The control unit 509 controls to read out the selected image file from the nonvolatile memory 508 or memory card 512, and controls the external I/F 513 to transmit the readout image file to the external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244331, filed on Nov. 26, 2013 which is hereby incorporated by reference herein in its entirety.

What is claimed is:

1. An image sensor comprising:
a pixel unit in which a plurality of first pixel columns and a plurality of second pixel columns are arranged, wherein a plurality of pixels of a first color and a plurality of pixels of a second color are arranged in each first pixel column and a plurality of pixels of the second color and a plurality of pixels of a third color are arranged in each second pixel column;
a plurality of first signal output lines each of which a pixel signal of each of the first pixel columns is output to from the pixel unit;
a plurality of second signal output lines each of which a pixel signal of each of the second pixel columns is output to from the pixel unit;
a reference signal generator which generates a first reference signal and a second reference signal which is different from the first reference signal;
a plurality of first comparators each of which compares a signal level of a pixel signal output to each of the plurality of first signal output lines with a signal level of the first reference signal;
a plurality of first counters each of which counts until the signal level of the pixel signal coincides with the signal level of the first reference signal by the first comparator;
a plurality of second comparators each of which compares a signal level of a pixel signal output to each of the plurality of second signal output lines with a signal level of the second reference signal; and
a plurality of second counters each of which counts until the signal level of the pixel signal coincides with the signal level of the second reference signal by the second comparator,
wherein the reference signal generator provides the first reference signal to one of the first comparators that compares a signal level of a pixel signal of one of the first pixel columns nearest to each other and simultaneously provides the second reference signal to another of the first comparators that compares a signal level of a pixel signal of the other of the first pixel columns in a case where the pixel signals of the first pixel columns are output to the first signal output lines, respectively, and provides the first reference signal to one of the second comparators that compares a signal level of a pixel signal of one of the second pixel columns nearest to each other and simultaneously provides the second reference signal to another of the second comparators that compares a signal level of a pixel signal of the other of the second pixel columns in a case where the pixel signals of the second pixel columns are output to the second signal output lines, respectively.

2. The sensor according to claim 1, wherein an output start timing of the first reference signal is different from an output start timing of the second reference signal.

3. The sensor according to claim 1, wherein a signal level at which output of the first reference signal starts is different from a signal level at which output of the second reference signal starts.

4. The sensor according to claim 1, wherein a rate of change of the second reference signal is higher than a rate of change of the first reference signal.

5. The sensor according to claim 1, wherein while the pixel signals are output to the plurality of first and second signal output lines, a rate of change of the second reference signal is set higher than a rate of change of the first reference signal, and while reset levels of the pixels are output to the plurality of output lines, the rate of change of the second reference signal and the rate of change of the first reference signal are set equal to each other.

6. The sensor according to claim 1, wherein the signal level of the first reference signal increases with time, and the signal level of the second reference signal decreases with time.

7. The sensor according to claim 1, wherein each of the counters starts counting in response to start of output of a corresponding one of the first reference signal and the second reference signal to be compared.

8. The image sensor according to claim 1, wherein the pixel unit is arranged in a first semiconductor chip, the reference signal generator, the first and second comparators, and the first and second counters are arranged in a second semiconductor chip, and the first semiconductor chip and the second semiconductor chip are stacked on each other.

9. An image capturing apparatus comprising an image sensor comprising:
a pixel unit in which a plurality of first pixel columns and a plurality of second pixel columns are arranged, wherein a plurality of pixels of a first color and a plurality of pixels of a second color are arranged in each first pixel column and a plurality of pixels of the second color and a plurality of pixels of a third color are arranged in each second pixel column;
a plurality of first signal output lines each of which a pixel signal of each of the first pixel columns is output to from the pixel unit; a reference signal generator which generates a first reference signal and a second reference signal which is different from the first reference signal;
a plurality of first comparators each of which compares a signal level of a pixel signal output to each of the plurality of first signal output lines with a signal level of the first reference signal;
a plurality of first counters each of which counts until the signal level of the pixel signal coincides with the signal level of the first reference signal by the first comparator;
a plurality of second comparators each of which compares a signal level of a pixel signal output to each of the plurality of second signal output lines with a signal level of the second reference signal; and
a plurality of second counters each of which counts until the signal level of the pixel signal coincides with the signal level of the second reference signal by the second comparator,
wherein the reference signal generator provides the first reference signal to one of the first comparators that compares a signal level of a pixel signal of one of the first pixel columns nearest to each other and simultaneously provides the second reference signal to another of the first comparators that compares a signal level of a pixel signal of the other of the first pixel columns in a case where the pixel signals of the first pixel columns are output to the first signal output lines, respectively, and provides the first reference signal to one of the second comparators that compares a signal level of a pixel signal of one of the second pixel columns nearest to each other and simultaneously provides the second reference signal to another of the second comparators that compares a signal level of a pixel signal of the other of the second pixel columns in a case where the pixel signals of the second pixel columns are output to the second signal output lines, respectively.

10. The image capturing apparatus according to claim 9, further comprising a display which displays an image captured by the image sensor.

11. The image capturing apparatus according to claim 9, further comprising a recording unit which records an image captured by the image sensor on a memory.

12. The image capturing apparatus according to claim 9, wherein the pixel unit is arranged in a first semiconductor chip, the reference signal generator, the first and second comparators, and the first and second counters are arranged in a second semiconductor chip, and the first semiconductor chip and the second semiconductor chip are stacked on each other.

13. A cellular phone comprising an image sensor comprising:
a pixel unit in which a plurality of first pixel columns and a plurality of second pixel columns are arranged, wherein a plurality of pixels of a first color and a plurality of pixels of a second color are arranged in each first pixel column and a plurality of pixels of the second color and a plurality of pixels of a third color are arranged in each second pixel column;
a plurality of first signal output lines each of which a pixel signal of each of the first pixel columns is output to from the pixel unit;
a plurality of second signal output lines each of which a pixel signal of each of the second pixel columns is output to from the pixel unit;
a reference signal generator which generates a first reference signal and a second reference signal which is different from the first reference signal;
a plurality of first comparators each of which compares a signal level of a pixel signal output to each of the plurality of first signal output lines with a signal level of the first reference signal;
a plurality of first counters each of which counts until the signal level of the pixel signal coincides with the signal level of the first reference signal by the first comparator;
a plurality of second comparators each of which compares a signal level of a pixel signal output to each of the plurality of second signal output lines with a signal level of the second reference signal; and
a plurality of second counters each of which counts until the signal level of the pixel signal coincides with the signal level of the second reference signal by the second comparator,
wherein the reference signal generator provides the first reference signal to one of the first comparators that compares a signal level of a pixel signal of one of the first pixel columns nearest to each other and simultaneously provides the second reference signal to another of the first comparators that compares a signal level of a pixel signal of the other of the first pixel columns in a case where the pixel signals of the first pixel columns are output to the first signal output lines, respectively, and provides the first reference signal to one of the second comparators that compares a signal level of a pixel signal of one of the second pixel columns nearest to each other and simultaneously provides the second reference signal to another of the second comparators that compares a signal level of a pixel signal of the other of the second pixel columns in a case where the pixel signals of the second pixel columns are output to the second signal output lines, respectively.

14. The cellular phone according to claim 13, further comprising a display which displays an image captured by the image sensor.

15. The cellular phone according to claim 13, further comprising a recording unit which records an image captured by the image sensor on a memory.

16. The cellular phone according to claim 13, wherein the pixel unit is arranged in a first semiconductor chip, the reference signal generator, the first and second comparators, and the first and second counters are arranged in a second semiconductor chip, and the first semiconductor chip and the second semiconductor chip are stacked on each other.

* * * * *